(12) United States Patent
Markman

(10) Patent No.: US 12,169,690 B2
(45) Date of Patent: Dec. 17, 2024

(54) DISCOVERY, EXTRACTION, AND RECOMMENDATION OF TALENT-SCREENING QUESTIONS

(71) Applicant: Microsoft Technology Licensing, LLC, Redmond, WA (US)

(72) Inventor: Vita G. Markman, San Francisco, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 563 days.

(21) Appl. No.: 17/458,259

(22) Filed: Aug. 26, 2021

(65) Prior Publication Data

US 2023/0064226 A1 Mar. 2, 2023

(51) Int. Cl.
*G06F 40/284* (2020.01)
*G06F 16/903* (2019.01)
*G06F 16/9032* (2019.01)
*G06F 40/289* (2020.01)
*G06Q 10/1053* (2023.01)

(52) U.S. Cl.
CPC ........ *G06F 40/284* (2020.01); *G06F 16/9032* (2019.01); *G06F 16/90344* (2019.01); *G06F 40/289* (2020.01); *G06Q 10/1053* (2013.01)

(58) Field of Classification Search
CPC .............. G06F 40/284; G06F 16/9032; G06F 16/90344; G06F 40/289; G06Q 10/1053
USPC .......................................................... 704/9
See application file for complete search history.

(56) References Cited

U.S. PATENT DOCUMENTS

| | | | | |
|---|---|---|---|---|
| 9,465,792 | B2 * | 10/2016 | Jifroodian-Haghighi | G06F 40/242 |
| 9,779,632 | B2 * | 10/2017 | Shakeri | G09B 5/00 |
| 9,852,132 | B2 * | 12/2017 | Chhichhia | G06F 16/9535 |
| 10,678,769 | B2 * | 6/2020 | Karmakar | G06F 16/2272 |
| 11,283,840 | B2 * | 3/2022 | Murray | G06Q 50/265 |

(Continued)

FOREIGN PATENT DOCUMENTS

| | | | | |
|---|---|---|---|---|
| CN | 110020213 A | * | 7/2019 | G06F 17/2715 |
| KR | 102345005 B1 | * | 12/2021 | |
| WO | WO-2020033409 A1 | * | 2/2020 | G06F 16/2246 |

OTHER PUBLICATIONS

Foreign document with translation.*

Primary Examiner — Edwin S Leland, III
(74) Attorney, Agent, or Firm — KDW FIRM PLLC

(57) ABSTRACT

Methods, systems, and computer programs are presented for automatically generating phrase-based talent-screening questions. One method includes analyzing job descriptions to generate ngrams. Each ngram comprises one or more words. Further, the method includes identifying, from the ngrams, an ngram set comprising a predetermined number of bigrams and trigrams according to frequency of appearance in the job descriptions. The method further includes removing, from the ngram set, bigrams and trigrams comprising one or more of stop words, negation words, or requirement words, to obtain first seed phrases. The first seed phrases are filtered based on a frequency of appearance of the seed phrase in the job descriptions to obtain second seed phrases. Further, the second seed phrases are added to the first seed phrases to obtain third seed phrases. Each seed phrase is a sequence of one or more words that is associated with a category of talent-screening questions.

12 Claims, 8 Drawing Sheets

(56) References Cited

U.S. PATENT DOCUMENTS

| | | | |
|---|---|---|---|
| 11,366,859 B2* | 6/2022 | Stevens | G06F 16/90335 |
| 11,425,160 B2* | 8/2022 | Murray | H04L 63/1433 |
| 11,526,672 B2* | 12/2022 | Kerr | G06F 40/30 |
| 2009/0222551 A1* | 9/2009 | Neely | G06F 16/951 |
| | | | 709/224 |
| 2015/0324459 A1* | 11/2015 | Chhichhia | G06N 5/02 |
| | | | 706/12 |
| 2016/0034757 A1* | 2/2016 | Chhichhia | G06F 16/35 |
| | | | 382/206 |
| 2016/0147891 A1* | 5/2016 | Chhichhia | G06F 16/986 |
| | | | 707/734 |
| 2016/0188566 A1* | 6/2016 | Jifroodian-Haghighi | |
| | | | G09B 5/02 |
| | | | 704/10 |
| 2016/0189034 A1* | 6/2016 | Shakeri | G09B 5/00 |
| | | | 706/47 |
| 2016/0189035 A1* | 6/2016 | Shakeri | G09B 5/00 |
| | | | 706/47 |
| 2016/0189036 A1* | 6/2016 | Shakeri | G06F 16/2455 |
| | | | 706/47 |
| 2018/0211260 A1* | 7/2018 | Zhang | G06N 20/00 |
| 2020/0042508 A1* | 2/2020 | Karmakar | G06N 20/00 |
| 2021/0157858 A1* | 5/2021 | Stevens | G06F 40/279 |
| 2021/0211472 A1* | 7/2021 | Murray | G06N 20/20 |
| 2021/0232767 A1* | 7/2021 | Kerr | G06F 16/2237 |
| 2021/0367963 A1* | 11/2021 | Murray | H04L 63/0414 |
| 2023/0064226 A1* | 3/2023 | Markman | G06F 16/9032 |

* cited by examiner

100

| | |
|---|---|
| Search for people by skill, employer, and more | 🔍 |

COMPOSE JOB

JOB DETAILS ─────────────────

| | | |
|---:|---|---|
| JOB TITLE | ☐ | 102 |
| COMPANY | ☐ | 103 |
| COUNTRY | ☐ | 104 |
| POSTAL CODE | ☐ | 105 |
| LOCATION | ☐ | 106 |
| TYPE | ☐ | 107 |
| EXPERIENCE | ☐ | 108 |
| INDUSTRY | ☐ | 109 |
| JOB FUNCTION | ☐ | 110 |
| COMPENSATION | ☐ | 111 |
| REFERRAL BONUS | ☐ | 112 |
| EMPLOYER JOB ID | ☐ | 113 |
| TRACKING PIXEL | ☐ | 114 |
| JOB DESCRIPTION | ☐ | 115 |

SKILLS [+ ADD SKILL] ~ 116    DEGREE [+ DEGREE] ~ 117

SUGGESTED SCREENING QUESTION ☐ ~ 118

[+ ADD] ~ 120

FIG. 1

DISCOVERY, EXTRACTION, AND RECOMMENDATION OF TALENT-SCREENING QUESTIONS

TECHNICAL FIELD

The subject matter disclosed herein generally relates to methods, systems, and machine-readable storage media for improving user interfaces.

BACKGROUND

When placing a job posting, job posters sometimes add screening questions for potential candidates in order to simplify and accelerate the selection process for candidates applying for the job. For example, "How many years of machine-learning experience do you have?" can be one such talent screening question, and the job poster may set up a minimum favorable answer of five years to be considered for the job. The job poster can then quickly eliminate candidates that do not meet a requirement with a minimum of five years of experience.

Some solutions for recommending talent-screening questions use machine learning and require manual labeling of a training set, which can be quite large, so these solutions rely on a large amount of human labor.

Other solutions may use word searches to identify a job requirement. However, word searches may create false positives, such as "we are a drug test development company looking for a chemist," will create a false positive of a requirement that employees require drug testing.

As the job market evolves, so do the requirements for new jobs. For example, during the pandemic, the need for delivery drivers grew substantially. The changing needs of the market means that new screening questions will arise.

BRIEF DESCRIPTION OF THE DRAWINGS

Various of the appended drawings merely illustrate example embodiments of the present disclosure and cannot be considered as limiting its scope.

FIG. 1 is a user interface for creating a job posting, according to some example embodiments.

DETAILED DESCRIPTION

Figure 2:
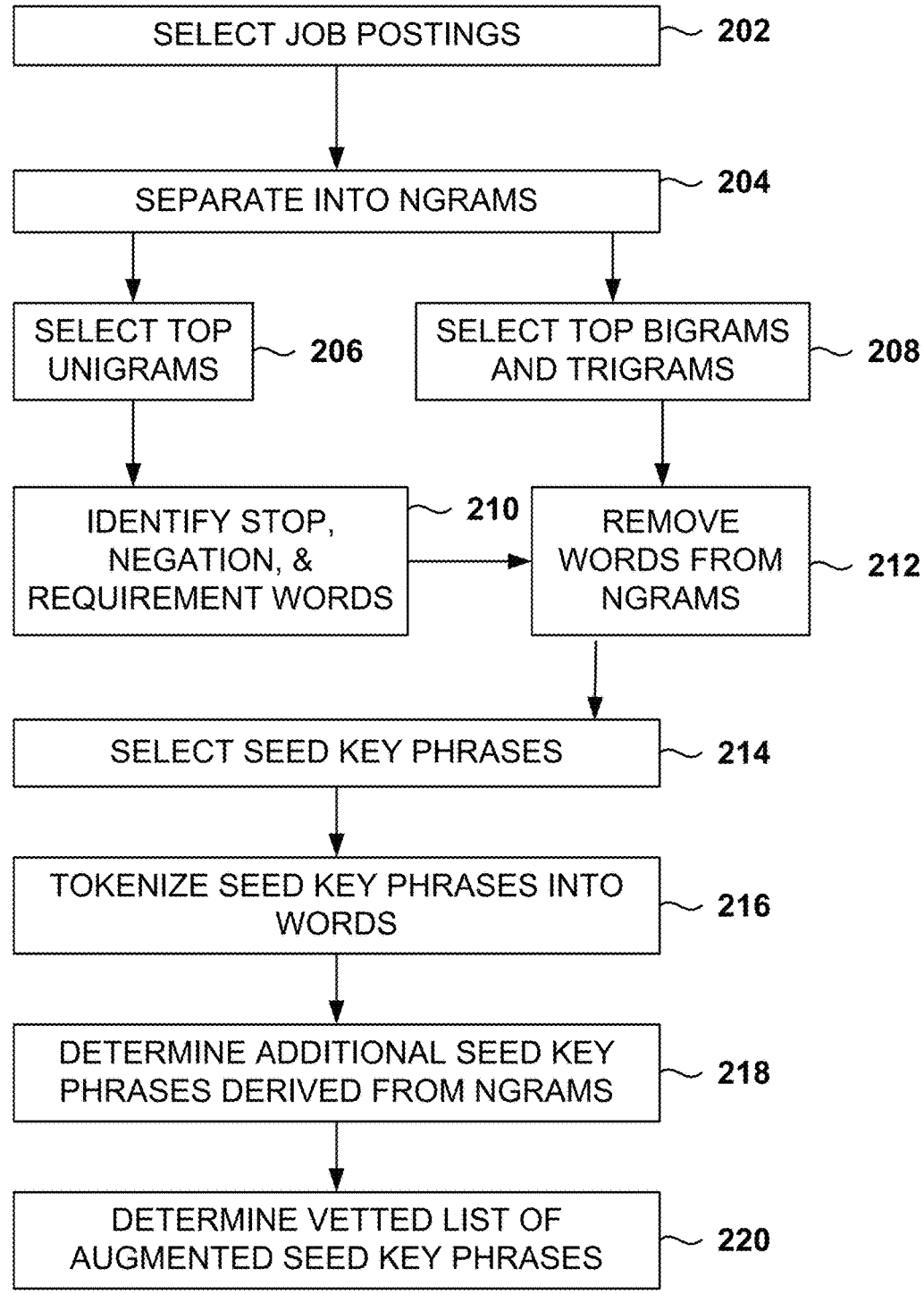
FIG. 2 is a flowchart of a method for the discovery and extraction of key phrases in a job description, according to some example embodiment.

Example methods, systems, and computer programs are directed to automatically generating talent-screening questions. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A recommender system generates talent-screening questions to a user placing a job posting. In order to keep up with the evolving job market trends, the system analyzes new job postings and determines new screening questions based on the evolution of the job market, such as "Do you have a valid driver's license?"

In one aspect, an algorithm is presented for discovering and extracting key phrases that indicate trending job requirements in job postings. A method is presented for recommending new talent-screening questions based on the discovered trending job requirements.

The algorithm includes two parts: a first part for the discovery and extraction of key phrases that indicate trending job requirements, and a second part for matching the extracted key phrases to recommend new talent-screening questions for presentation to the job poster.

One general aspect includes a method that includes an operation for analyzing job descriptions to generate ngrams. Each ngram comprises one or more words. Further, the method includes identifying, from the ngrams, an ngram set comprising a predetermined number of bigrams and trigrams according to frequency of appearance in the job descriptions. The method further includes removing, from the ngram set, bigrams and trigrams comprising one or more of stop words, negation words, or requirement words, to obtain first seed phrases. The first seed phrases are filtered based on a frequency of appearance of the seed phrase in the job descriptions to obtain second seed phrases. Further, the second seed phrases are added to the first seed phrases to obtain third seed phrases. Each seed phrase is a sequence of one or more words that is associated with a category of talent-screening questions.

For the purposes of this description the phrases "an online social networking application," "an online social network system," and "an online social network service" may be referred to as and used interchangeably with the phrase "an online social network" or merely "a social network." It will also be noted that an online social network may be any type of an online social network, such as, e.g., a professional network, an interest-based network, or any online networking system that permits users to join as registered members. For the purposes of this description, registered members of an online social network may be referred to as simply members. Further, some online services provide services to their members (e.g., search for jobs, search for candidates for jobs, job postings) without being a social network, and the principles presented herein may also be applied to these online services.

FIG. 1 is a user interface 100 for creating a job posting, according to some example embodiments. The job poster may enter data for a plurality of job posting fields 102-117. Some of the fields might be required, such as company 103, while other fields may be optional, such as compensation 111. The user interface 100 allows the job poster to fine tune the targeting of job candidates for the specific job by entering information about the job posting fields 102-117.

The job posting fields 102-117 include a job title 102, the company 103 hiring for the job, a country 104 where the job is located, a postal code 105 where the job is located, a location 106 (e.g., street address, city) of the job, a type 107 (e.g., full-time, part-time, contractor), experience 108 (e.g., number of years working for a similar job), an industry 109, a job function 110 (e.g., manager), a compensation 111, a referral bonus 112 offered for a referral resulting in a hire, an employer job identifier 113, a tracking pixel 114, a job description 115, zero or more skills 116, and zero or more degrees 117. The information entered by the job poster enables fine targeting for selecting job applicants that match the characteristics of the job posting. The job description 115 is text entered by the job poster that describes the details of the job posting, and may include a description of the job responsibilities, technical requirements, company information, benefits, etc., and may even include some of the information of the other job-posting fields, such as company offering the job posting, compensation, country, etc.

In some example embodiments, a screening-question field 118 presents a talent-screening question that may be used by the job poster to filter candidates. The job poster may accept the suggestion by selecting add button 120. In other example embodiments, a plurality of talent-screening questions may be presented, and the job poster may select any of the suggestions. Scroll buttons may be included, or a separate window may be used to present and select talent-screening questions.

As used herein, a talent-screening question is a question that a job poster includes when posting the job posting. The talent-screening questions are presented to interested candidates that apply for the job, and the candidates must answer the talent-screening questions in order to qualify for the job. The candidates who provide answers that do not meet the criteria associated with the talent-screening question will be eliminated as viable candidates.

For example, if a question "Are you authorized to work in the US?" is answered negatively, then the candidate will be rejected automatically since the job requires an employee to be authorized to work in the US.

The job poster may enter custom talent-screening questions. Additionally, the system may provide recommendations as illustrated in FIG. 1. In some example embodiments, the recommendations are generated based on the text of the job posting, and optionally, other parameters such as company, user profile, etc.

The problem with existing recommendation systems is that the talent-screening questions are predefined, and the system selects from the predefined talent-screening questions. However, if new trends in the job market require new screening questions, existing recommendation systems are not able to automatically modify the questions.

It is important that the talent-screening questions be relevant to the job posting and avoid improper recommendations. For example, if the job post mentions the words "driver" and "license" in a context such as, "The key driver for success in our company is our license to sell new products", the system should not recommend "Do you have a valid driver's license?" When the job posting mentions a sentence such as, "Candidates must possess a current driver's license," the question about having a valid driver's license should be recommended. The matching and recommendation methods described herein address how to automatically recommend relevant questions, while avoiding false positive matches. The methods provide for automatically determining relevant talent-screening questions from an existing set of talent-screening questions and provides for the creation of new talent-screening questions.

FIG. 2 is a flowchart of a method 200 for the discovery and extraction of key phrases in a job description, according to some example embodiment. While the various operations in this flowchart are presented and described sequentially, one of ordinary skill will appreciate that some or all of the operations may be executed in a different order, be combined or omitted, or be executed in parallel.

The process for the determining talent-screening questions is divided in two parts. Part 1, illustrated in FIG. 1, is for the discovery of key phrases that indicate trending job requirements in job postings. Part 1 is for the discovery of new possible talent-screening questions that are based on the job posting.

For example, assuming that the current system does not include a talent-screening question for drug testing, and if suddenly many new job postings start requiring drug testing for employees, the goal of part 1 is to detect this new trend and identify key phrases for the determination of new talent-screening questions, such as, "Are you willing to take a drug test?"

In order to keep the talent-screening recommendation system current, the system detects new trends and the appearance of new requirements in order to generate the new talent-screening questions.

At operation 202, the job postings in a database are accessed and a predefined number of the job postings are selected (e.g., one million recent job postings) to obtain the job description and other related information. The job descriptions of the selected job postings are used for the determination of the key phrases. Further, any Personal Identifiable Information (PII) is removed from the sampled job descriptions, leaving the rest of the text of the job descriptions. In some example embodiments, the job identifier (ID), if any, is also removed from the job description.

At operation 204, the system separates the text from the job descriptions obtained at operation 202 into unigrams, bigrams, and trigrams. Further, the system calculates the frequencies with which these ngrams occur.

A unigram is a single word in the text of the job description. A bigram is contiguous sequence of two words in the text of the job description. A trigram is contiguous sequence of three words in the text of the job description. Unigrams, bigrams, and trigrams are generally referred to herein as "ngrams" (e.g., a sequence of n words).

For example, the sentence, "We require valid license" has unigrams {we, require, valid, license}, bigrams {we require, require valid, valid license}, and trigrams {we require valid, require valid license}.

Although some embodiments refer to unigrams, bigrams, and trigrams, other embodiments may also use other ngrams, such as 4-grams, 5-grams, etc.

After operation 204, the method 200 performs operations 206 and 208. The unigrams, bigrams, and trigrams are sorted by the frequency in which they appear in job descriptions. At operation 206, a predetermined top number of unigrams are selected according to their frequency (e.g., top 10,000 unigrams, but other numbers may be selected). The top unigrams are the unigrams with the highest frequency of occurrence in the job descriptions.

At operation 208, a predetermined top number of bigrams are selected according to their frequency (e.g., top 5,000 bigrams, but other numbers may be selected), and a predetermined top number of trigrams are selected according to their frequency (e.g., top 3,000 trigrams, but other numbers may be selected).

At operation 210, from the selected top unigrams, a predetermined number (e.g., 300, but other numbers may be selected) of the most frequent unigrams are identified. These top unigrams are analyzed to identify stop words, negation words, and requirement words. In some embodiments, this selection is done using a speech tagger. In other embodiments, a search tool may be used.

Stop words are highly used words, such as prepositions and articles, that are the most common words used in language, such as "a," "the," "o" etc. Negation words are those that show negation in a sentence, and include "no," "not," "don't," "doesn't," "never," "wasn't," "cannot," etc. Requirement words are words that, as the name suggests, show a requirement in a sentence, such as "required," "must," "have," "preferred," "experience," etc. The identified stop words, negation words, and requirement words are stored in respective lists.

At operation 212, the selected top bigrams and trigrams containing the identified stop, negation, and requirement words are removed from the corresponding list. For example, ngrams such as "of the", "requirement of", "experience in," "but not," and "not required," are removed from further consideration.

Typically, stop, negation, and requirement words do not contribute to the selection of talent-screening questions. The goal is to get actual ngrams that are useful for identifying talent-screening questions.

After operations 210 and 212, the lists of ngrams candidates for talent-screening question has been reduced considerably, e.g., 500 to 600 ngrams remaining.

At operation 214, seed key phrases, also referred to herein as seed phrases, are selected, which include the remaining unigrams, bigrams, and trigrams. A seed key phrase is a sequence of one or more words associated with a category of talent-screening questions. When the seed key phrase is matched to the words in a sentence of a job posting, the corresponding talent-screening question is associated with the sentence and may be recommended to the job poster.

These seed key phrases may include valuable ngrams, such as "machine learning," "drug test," "security clearance," "driver's license," "valid driver's license," "top security clearance," etc. The seed key phrases will be used to obtain additional key phrases from the remaining list of ngrams automatically.

In some cases, the shorter list of ngrams may be manually vetted to mark key phrases that indicate possible skills or requirements, and useless ngrams are eliminated from further consideration. In some example embodiments, the shorter list is filtered to discard the ngrams already identified in previous cycles, and the manual vetting is performed on an even shorter list of ngrams.

The seed key phrases will be used to obtain additional phrases from the remaining ngrams in an automated fashion.

At operation 216, the remaining seed key phrases, obtained at operation 214, are tokenized into individual words, such as "drug," "test," "driver," "license," "security," "clearance," "machine," "learning," etc. In general, tokenizing refers to transforming the words to a common format (e.g., lowercase), normalizing similar words into a same token (e.g., Joseph and Joe), and eliminating filler words (e.g., "a"). In some example embodiments, normalizing includes lowercasing the input stream, eliminating filler words, separating hyphenated words in the input stream into separate words, and making each word one of the tokens. In some example embodiments, a filler word is a word that is not part of a name, and is not a verb, a noun, or an adjective. For example, articles and prepositions are filler words. In other example embodiments, other criteria may be defined for filler words.

At operation 218, the list of bigrams and trigrams identified at operation 208 (e.g., 8K ngrams) are filtered to select the ngrams that meet the following criteria: 1) the ngram contains one of the tokens from operation 216; AND 2) the ngram does not contain any of the stop, negation, or requirement words from operation 210. The result is an additional list of seed key phrases (e.g., around 200 new seed key phrases) that were not as frequent as the seed key phrases obtained at operation 214, but that may also capture new trending skills or requirements. For example, the words "drug" and "test" in the seed key phrase "drug test" are used to identify a new key seed phrase "illegal substance test."

Below is a subset of an example of identified seed key phrases and their frequency:

valid driver s license 5618
government clearance 22590
background check drug 1347
check drug test 1050
driver s license with 943
drivers with positive 776
license change oil 672
driver s license fleet 527
driver s license vehicle 503
must valid driver s 499
drivers with clean 499
check include drug 146
global drug development 133
driver s license times 405
driver license reliable 400.

At operation 220, the addition key seed phrases can be vetted manually again, which is a quick process since it is a short list. The result is additional seed key phrases added to the seed key phrases from operation 214, which are the candidates for creating the talent-screening questions.

In some example embodiments, the seed key phrases are assigned a category based on their meaning, categories such as "license," "drug test," and "security clearance." The category assists in recommending the talent-screening question for new job postings when the job posting text matches one of the seed key phrases. Each category will be associated with one talent-screening question, which may be presented to the job poster.

Figure 3:
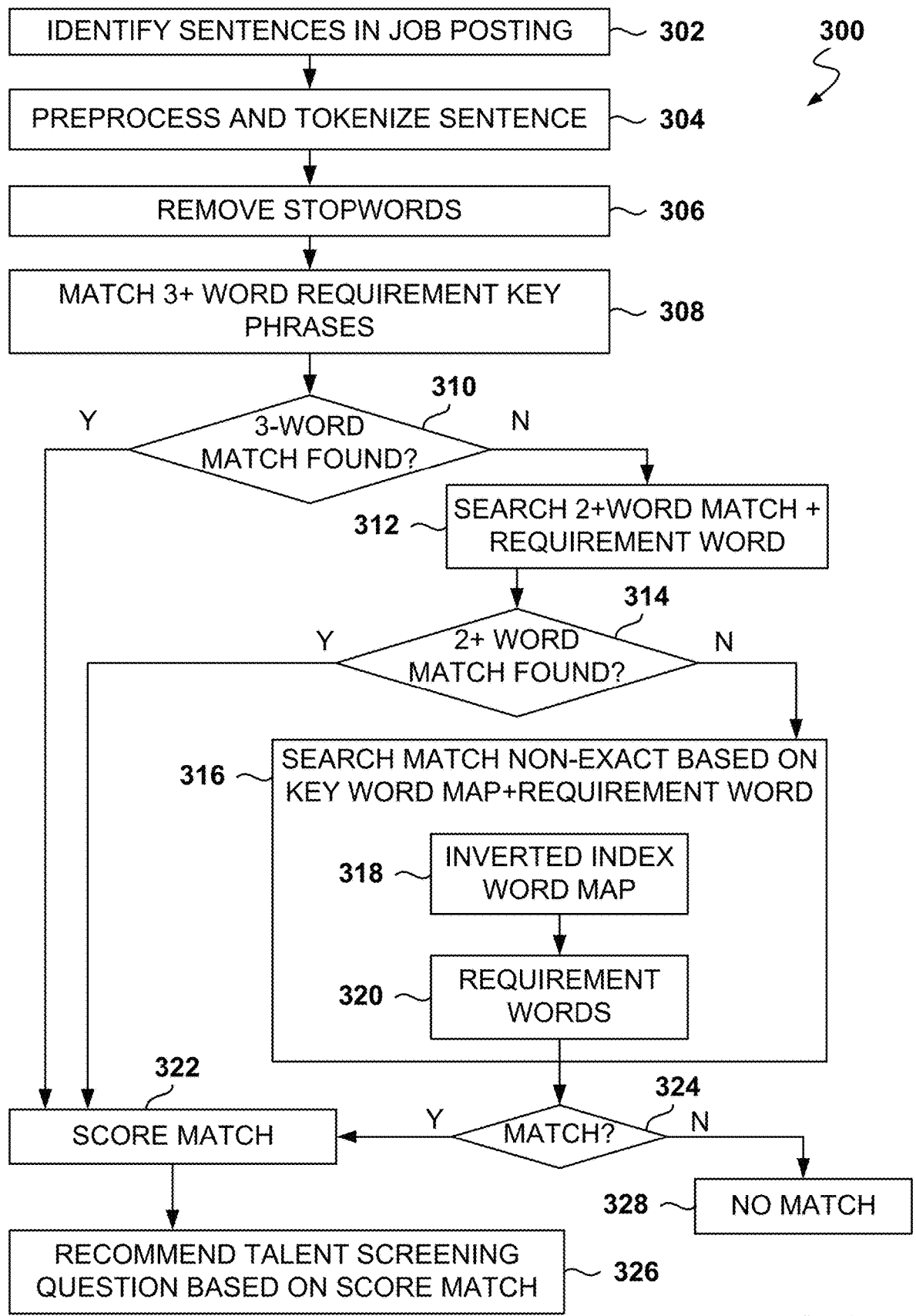
FIG. 3 is a flowchart of a method for matching key phrases to recommend talent screening questions, according to some example embodiments.

FIG. 3 is a flowchart of a method for matching key phrases to recommend talent screening questions based on the seed key phrases, according to some example embodiments. While the various operations in this flowchart are presented and described sequentially, one of ordinary skill will appreciate that some or all of the operations may be executed in a different order, be combined or omitted, or be executed in parallel.

Method 300 is for generating new talent-screening questions based on matching job postings and the identified seed key phrases. For example, a sentence in the job description stating, "We require you to take a drug test," will match the seed key phrase "drug test" and the system will recommend the talent-screening question, "Are you willing to take a drug test?"

At operation 302, the sentences in incoming job postings are identified. After the job poster enters the text of the job posting, the description is separated into individual sentences, e.g., via a sentence-splitting program. In some example embodiments, the talent-screening question are generated based on the identified sentences, that is, sentence by sentence.

In some example embodiments, the sentences are processed after the job poster finishes entering the job description, but in other embodiments, the sentences may be analyzed on the fly as the job poster is entering the description.

For example, if a sentence contains a negation word, the sentence is discarded from further consideration. This is done because there is no confidence in using a sentence that contains one or more seed key phrases but also contains a negation.

At operation 304, the identified sentences are preprocessed and tokenized. The preprocessing includes some text processing to the sentences, such as separating possessive marker "s" from the nouns into a separate token "s" and negation markers (e.g., "n't") with a standardized negation token, e.g., "nt." As discussed above, tokenizing includes adopting a standard format for each word.

At operation 306, stop words are removed from the sentences. From operation 306, the method 300 flows to operation 308 where the search for ngrams begins. Initially, the search is for exact matches between a sentence and a 3+ seed key phrase.

For example, the sentence "driver s license is required" will have an exact match for the seed key phrase "driver s license." The search for matches with seed key phrases, with three or more tokens, is performed for all the identified sentences in the job description. The matched sentences are then scored, as described below.

It is noted that some of the ngrams of the seed key phrases may be longer than three, as the ngrams may increase the number of words when a seed key phrase is standardized, such as by converting "driver's" into "driver s." Therefore, some of the seed key phrases may include more than three words, although the initial filtering was for trigrams or smaller.

At operation 310, a check is made to determine if at least one 3+ sequence has been found. If found, the method 300 flows to operation 322, and if not found, the method 300 proceeds to operation 312 to search for sequences with less than three words.

At operation 312, a search is performed for sentences with matches of seed key phrases with two or more words and that include a requirement word in the sentence. For example, if a sentence includes the seed key phrase "drug test", the sentence is searched for one or more "requirement" expressions in the same sentence. If a match of two or more words is found, but there is no requirement word, the sentence is ignored for generating a talent-screening question. The rationale is that there will not be confidence that the match is a requirement for a job.

For example, "drug test" without a requirement word in the sentence may result in irrelevant false positive phrases, such as "we are a drug test development company looking for a chemist." By not selecting these sentences, the system will not identify a talent-screening question such as, "are you willing to take a drug test?" However, if the sentence "we are a drug test development company and a drug test is required," then this sentence will be a match because it includes the word "required."

At operation 314, a check is made to determine if at least one match was made at operation 312. If at least one match is found, the method 300 flows to operation 322, and if no matches are found, the method 300 flows to operation 316.

Operation 316 is to search for non-exact matches that include a key word and a requirement word. Operation 316 includes operations 318 and 320.

At operation 318, an inverted-index word map is built from existing seed key phrases by tokenizing the seed key phrases into words and associating each word with the other words that appear in the seed key phrases. For example, in the seed key phrase "drug test," categorized in DRUG_TEST category, the word "drug" is selected, and a search is performed for all the words that appear with "drug" in the list of seed key phrases.

In one example, the result is a key map with the words [alcohol, include, completion, pre, screening, test, pass, subject, testing, substance, screen, check, employment, drug, background, passing, complete, successful] in the DRUG_TEST category. This means that the word "drug" appears in seed key phrases with the words alcohol, include, completion, pre, screening, test, etc. The process is performed for all the tokens in the seed key phrases.

From operation 318, the method 300 flows to operation 320 to find the mapped words at operation 318, that is, to find non-exact matches between the seed key phrases and the words of the sentence. For example, if the word "drug" is in the sentence, a search is made in the sentence for one of the words in the list associated with "drug," e.g., "test," "screening."

If a word is found in the list, then a check is made to determine if the sentence contains a requirement word. For example, a sentence in the job description is "drug or alcohol test is required," and a match will be made to the seed key phrase "drug test," even though "drug" is separated from "test" by several words. This is because "drug" is associated with "test" in the word map, and because the word "required" appears in the same sentence.

This approach avoids a false positive match for "drug development position" because "development" does not co-occur with the word "drug" in the word map. Further, a false positive match is avoided for the sentence "drug test is offered here," because the sentence does not contain a requirement word.

After operation 320, a check is made at operation 324 to determine if there was a match at operation 320. If a match is made, the method 300 flows to operation 322, and if a match is not made, the method 300 flows to operation 328 to determine that no matches have been found for the sentence, so no talent-screening question will be recommended.

At operation 322, the match (from any of operations 308, 312, and 320) is scored to obtain a confidence score indicating the value of the match. In some example embodiments, the confidence score is a value between 0 and 1, but other scoring ranges are also possible.

In some example embodiments, the score is calculated as the number of words matching the seed key phrase divided by a number that is calculated as the total number of words in the sentence minus the number of stop words in the sentence. For example, for the seed key phrase "driver license required" and the input sentence "driver license is required," then the match is perfect three out of three because the stop word "is" is not counted in the calculation.

From operation 322, the method 300 flows to operation 326 where the talent-screening question is recommended based on the score of the match. In some example embodiments, the matches with scores greater than a predetermined threshold will result in a talent-screening question recommendation.

In some example embodiments, the talent-screening question recommendation is the one associated with the category of the matched phrase. For example, for a match of "drug test" that belongs to "DRUG_TEST" category, in a sentence such as "drug or alcohol test is required," the recommended talent-screening question is, "Are you willing to take a drug test?"

One of the advantages of the method described herein for recommending talent-screening questions is that other machine-learning (ML) approaches require manual labeling of the training set, which can be quite large, so it requires a large amount of human labor. In the disclosed embodiments, a person has to review only short lists of new trending requirements, e.g., 200 requirements, which may be done very quickly. As the process is repeated periodically (e.g., monthly), the list will be shorter as the sentences already processed previously will not have to be reviewed again.

Another advantage is that the algorithm uses a small number of seed key phrases, which results in high performance and efficiency. Further, the algorithm doesn't add time overhead for selecting the talent-screening questions. Further, the algorithm may be performed periodically to detect new frequent ngrams that may result in the creation of new talent-screening questions.

Figure 4:
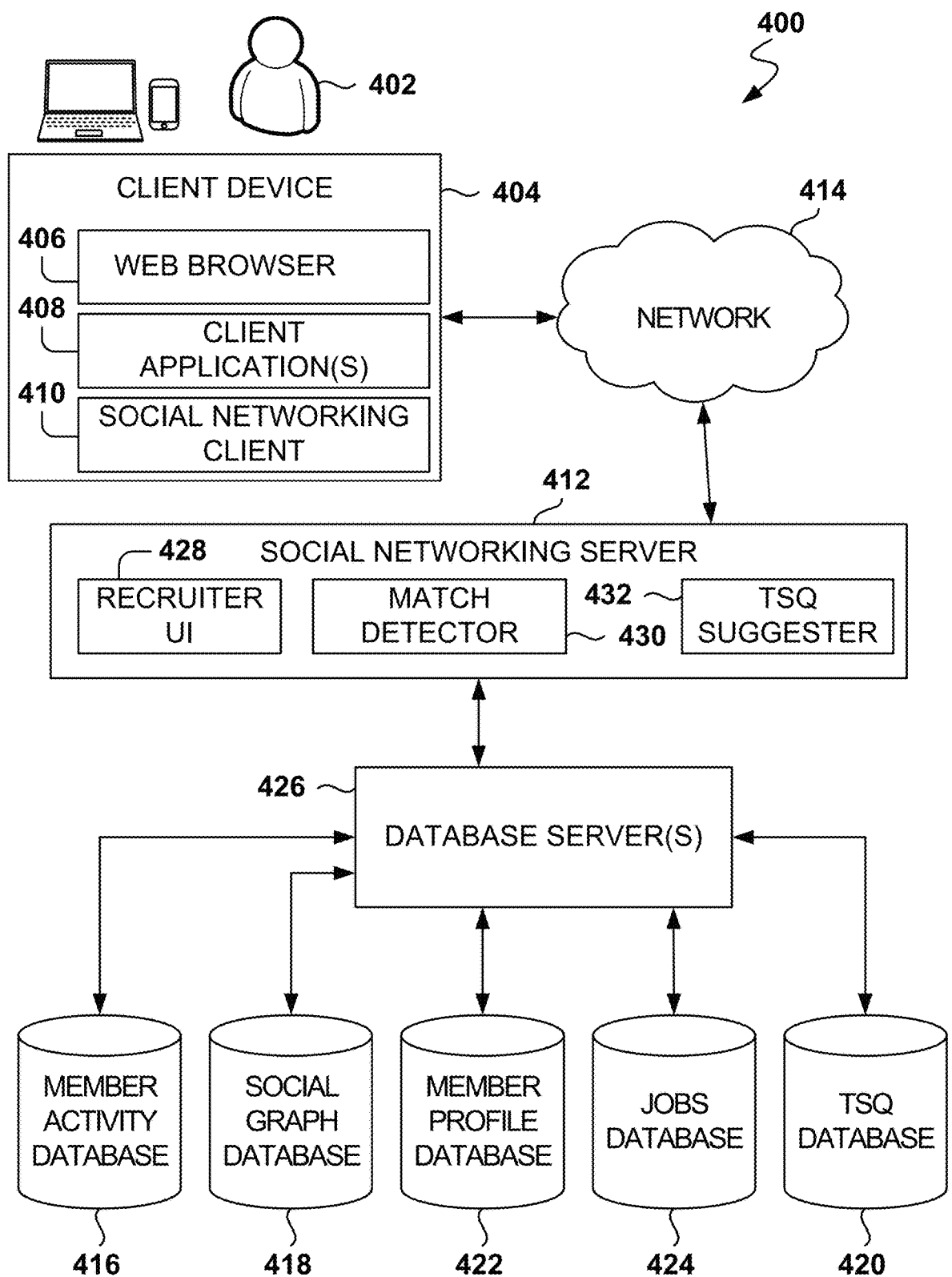
FIG. 4 is a block diagram illustrating a networked system, according to some example embodiments, illustrating an example embodiment of a high-level client-server-based network architecture.

FIG. 4 is a block diagram illustrating a networked system, according to some example embodiments, including a social networking server 412, illustrating an example embodiment of a high-level client-server-based network architecture 400. Embodiments are presented with reference to an online service and, in some example embodiments, the online service is a social networking service.

The social networking server 412 provides server-side functionality via a network 414 (e.g., the Internet or a wide area network (WAN)) to one or more client devices 404. FIG. 4 illustrates, for example, a web browser 406, client application(s) 408, and a social networking client 410 executing on a client device 404. The social networking server 412 is further communicatively coupled with one or more database servers 426 that provide access to one or more databases 416, 418, 422, 424, and 420.

The social networking server 412 includes, among other modules, a recruiter UI 428 (e.g., UI 100 of FIG. 1), a match detector 430, and a talent-screening question suggester 432. The match detector 430 analyzes job descriptions to determine matches with categories associated with talent-screening questions, described above with reference to FIG. 1. The talent-screening question suggester 432 provides the talent-screening question recommendations to the job poster via the recruiter UI 428.

The client device 404 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 402 may utilize to access the social networking server 412. In some embodiments, the client device 404 may comprise a display module (not shown) to display information (e.g., in the form of user interfaces).

In one embodiment, the social networking server 412 is a network-based appliance that responds to initialization requests or search queries from the client device 404. One or more users 402 may be a person, a machine, or other means of interacting with the client device 404. In various embodiments, the user 402 interacts with the social networking server 412 via the client device 404 or another means.

The client device 404 may include one or more applications (also referred to as "apps") such as, but not limited to, the web browser 406, the social networking client 410, and other client applications 408, such as a messaging application, an electronic mail (email) application, a news application, and the like. In some embodiments, if the social networking client 410 is present in the client device 404, then the social networking client 410 is configured to locally provide the user interface for the application and to communicate with the social networking server 412, on an as-needed basis, for data and/or processing capabilities not locally available (e.g., to access a user profile, to authenticate a user 402, to identify or locate other connected users 402, etc.). Conversely, if the social networking client 410 is not included in the client device 404, the client device 404 may use the web browser 406 to access the social networking server 412.

In addition to the client device 404, the social networking server 412 communicates with the one or more database servers 426 and databases 416, 418, 422, 424, and 420. In one example embodiment, the social networking server 412 is communicatively coupled to a member activity database 416, a social graph database 418, a member profile database 422, a job postings database 424, and a talent-screening question database 420. The databases may be implemented as one or more types of databases including, but not limited to, a hierarchical database, a relational database, an object-oriented database, one or more flat files, or combinations thereof.

The talent-screening question database 420 stores information associated with talent-screening questions, such as categories, talent-screening questions associated with the categories, tokens associated with the categories, etc.

In some example embodiments, when a user 402 initially registers to become a user 402 of the social networking service provided by the social networking server 412, the user 402 is prompted to provide some personal information, such as name, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. Similarly, when a representative of an organization initially registers the organization with the social networking service provided by the social networking server 412, the representative may be prompted to provide certain information about the organization, such as a company industry.

As users 402 interact with the social networking service provided by the social networking server 412, the social networking server 412 is configured to monitor these interactions. Examples of interactions include, but are not limited to, commenting on posts entered by other users 402, viewing user profiles, editing or viewing a user 402's own profile, sharing content outside of the social networking service (e.g., an article provided by an entity other than the social networking server 412), updating a current status, posting content for other users 402 to view and comment on, posting job suggestions for the users 402, searching job postings, and other such interactions. In one embodiment, records of these interactions are stored in the member activity database 416, which associates interactions made by a user 402 with his or her user profile.

The job postings database 424 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 426 are illustrated as a single block, one of ordinary skill in the art will recognize that the database server(s) 426 may include one or more such servers. Accordingly, and in one embodiment, the database server(s) 426 implemented by the social networking service are further configured to communicate with the social networking server 412.

Figure 5:
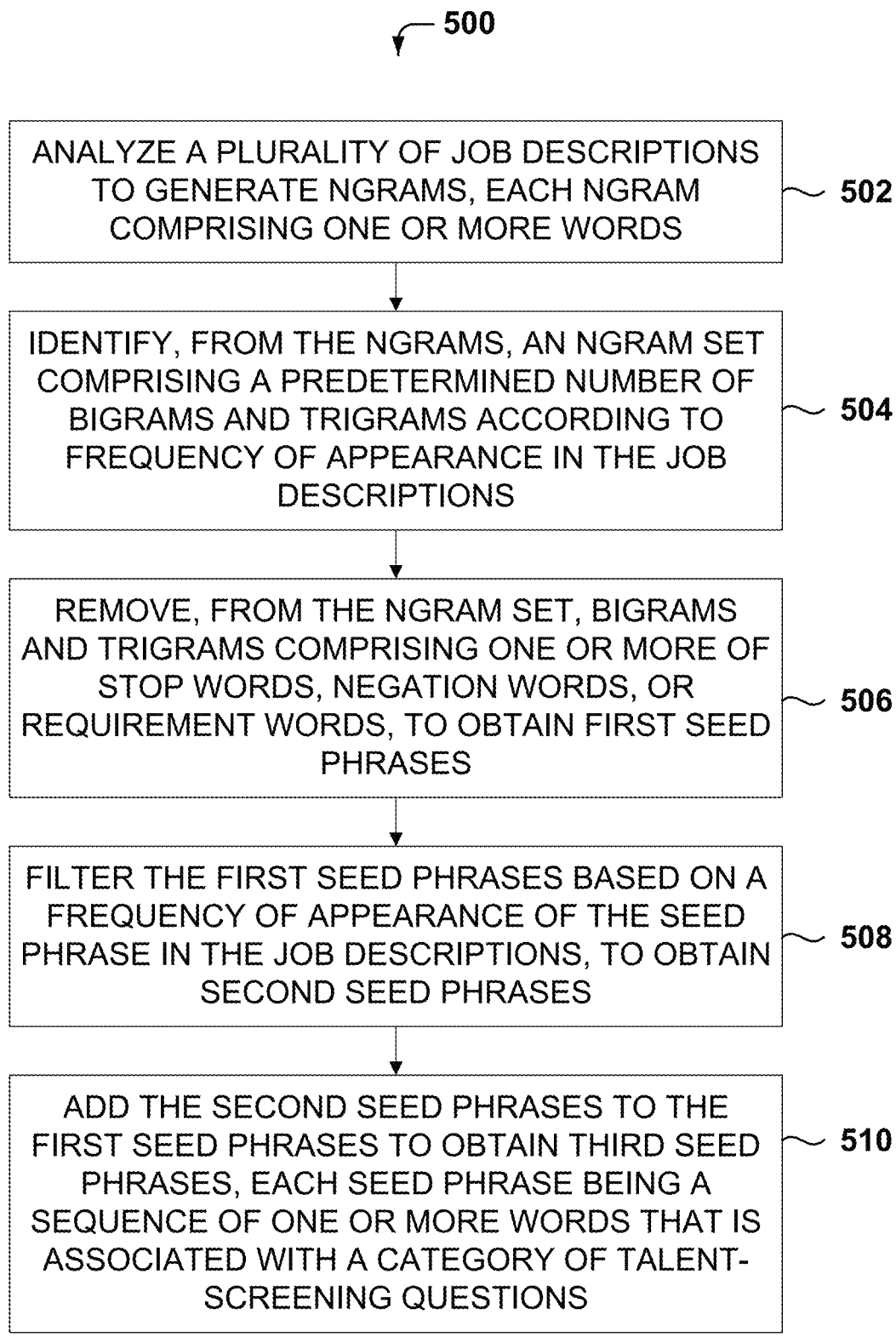
FIG. 5 is a flowchart of a method for the discovery and extraction of key phrases, according to some example embodiments.

FIG. 5 is a flowchart of a method 500 for the discovery and extraction of key phrases, according to some example embodiments. While the various operations in this flowchart are presented and described sequentially, one of ordinary skill will appreciate that some or all of the operations may be executed in a different order, be combined or omitted, or be executed in parallel.

Operation 502 is for analyzing, by one or more processors, a plurality of job descriptions to generate ngrams, each ngram comprising one or more words.

From operation 502, the method 500 flows to operation 504 where the one or more processors identify, from the ngrams, an ngram set comprising a predetermined number of bigrams and trigrams according to frequency of appearance in the job descriptions.

From operation 504, the method 500 flows to operation 506 to remove, from the ngram set, bigrams and trigrams comprising one or more of stop words, negation words, or requirement words, to obtain first seed phrases.

From operation 506, the method 500 flows to operation 508 to filter the first seed phrases based on a frequency of appearance of the seed phrase in the job descriptions, to obtain second seed phrases.

From operation 508, the method 500 flows to operation 510 where the second seed phrases is added to the first seed phrases to obtain third seed phrases. Each seed phrase is a sequence of one or more words that is associated with a category of talent-screening questions.

In one example, the method 500 further comprises tokenizing the initial seed phrases to obtain tokens.

In one example, filtering the first seed phrases further comprises selecting, from the ngram set, ngrams that contain at least one token and that do not contain any stop word, negation word, or requirement word to obtain the second seed phrases.

In one example, the ngrams comprise unigrams, bigrams, and trigrams.

In one example, the method 500 further comprises, before the removing, identifying the stop words, the negation words, and the requirement words in a predetermined number of unigrams.

In one example, the method 500 further comprises identifying a talent-screening question for a job posting based on a job description of the job posting and the third seed phrases.

In one example, the method 500 further comprises causing presentation of the identified talent-screening question in a user interface.

Figure 6:
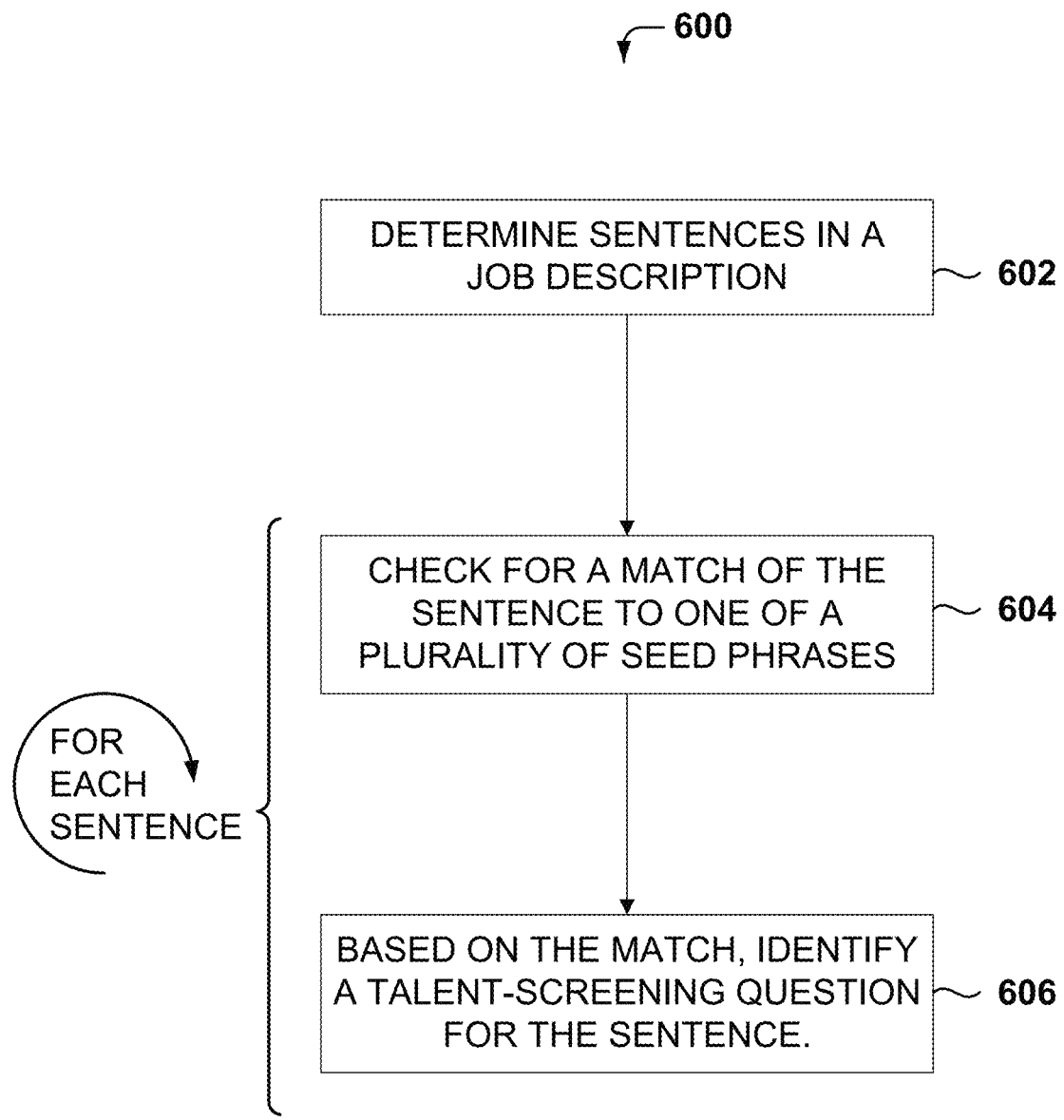
FIG. 6 is a flowchart of a method for matching key phrases, according to some example embodiments.

FIG. 6 is a flowchart of a method 600 for matching key phrases, according to some example embodiments. While the various operations in this flowchart are presented and described sequentially, one of ordinary skill will appreciate that some or all of the operations may be executed in a different order, be combined or omitted, or be executed in parallel.

Operation 602 is for determining, by one or more processors, sentences in a job description of a job posting.

From operation 602, the method 600 flows to operations 604 and 606 that are executed for each sentence. At operation 604, the one or more processors check for a match of the sentence to one of a plurality of seed phrases. Each seed phrase is a sequence of one or more words that is associated with a category of talent-screening questions. Furthermore, checking for the match comprises performing a first match operation to determine matches in the sentence to seed phrases with three or more words, and performing a second match operation to determine the sentences with requirement words that match seed phrases with two or more words.

At operation 606, the one or more processors identify, based on the match, a talent-screening question for the sentence.

In one example, checking for a match comprises a third match operation, and the third match operation comprises creating an inverted-index word map of the seed phrases, and finding sentences with a unigram in the seed phrases with a word associated with the unigram in the inverted-index word map, and with a requirement word.

In one example, finding sentences comprising a word appearing in the seed phrases comprises creating an inverted-index word map of the seed phrases by tokenizing the seed phrases into words and associating each word with the other words that appear in the seed phrases. Finding sentences comprising the second word associated with the word appearing in the seed phrases is based on the inverted-index word map of the seed phrases.

In one example, the method 600 further comprises calculating a score for each matched sentence, the score calculated as a number of words matching to the seed phrase divided by a number that is calculated as a total number of words in the sentence minus a number of stop words in the sentence.

In one example, the method 600 further comprises determining talent-screening questions for sentences with a score above a predetermined threshold.

In one example, the method 600 further comprises causing presentation of the determined talent-screening questions in a user interface.

Figure 7:
FIG. 7 is a flowchart of a method for generating talent-screening questions, according to some example embodiments.

FIG. 7 is a flowchart of a method 700 for generating talent-screening questions, according to some example embodiments. While the various operations in this flowchart are presented and described sequentially, one of ordinary skill will appreciate that some or all of the operations may be executed in a different order, be combined or omitted, or be executed in parallel.

Operation 702 is for determining, by the one or more processors, sentences in the first job description. Each first seed phrase is a sequence of one or more words that is associated with a category of talent-screening questions.

From operation 702, the method 700 flows to operations 704 and 706, which are performed for each sentence. At operation 704, the one or more processors check for a match of the sentence to one of the third seed phrases. At operation 710, the one or more processors identify, based on the match, a talent-screening question for the sentence.

In one example, analyzing the plurality of job descriptions further comprises: identifying unigrams, bigrams, and trigrams in the plurality of job descriptions; identifying stop words, negation words, and requirement words in a predetermined number of unigrams; removing from consideration bigrams and trigrams containing the identified stop words, negation words, and requirement words; and identifying second seed phrases after the removing.

In one example, analyzing the plurality of job descriptions further comprises: tokenizing the second seed phrases to obtain tokens; determining ngrams that include one of the tokens and do not include any of the stop words, negation words, or requirement words; and adding the determined ngrams to the second seed phrases to obtain the first seed phrases.

In one example, the method 700 further comprises, after determining the sentences, tokenizing the sentences, and removing stop words from the tokenized sentences.

In one example, checking for a match comprises a first match operation. The first match operation comprises determining matches in the sentence to first seed phrases with three or more words.

In one example, checking for a match comprises a second match operation. The second match operation comprises determining the sentences with requirement words that match first seed phrases with two or more words.

In one example, checking for a match comprises a third match operation. The third match operation comprises finding sentences comprising a word appearing in the first seed phrases, a second word that is associated with the word appearing in the first seed phrases, and a requirement word.

In one example, the method 700 further comprises calculating a score for each matched sentence. The score is calculated as a number of words matching the seed phrase divided by a number that is calculated as a total number of words in the sentence minus a number of stop words in the sentence.

In one example, the method 700 further comprises recommending talent-screening questions for sentences with a score above a predetermined threshold.

In one example, the method 700 further comprises presenting the identified talent-screening question in a user interface.

Another general aspect is for a system that includes a memory comprising instructions and one or more computer processors. The instructions, when executed by the one or more computer processors, cause the one or more computer processors to perform operations comprising: analyzing a plurality of job postings to identify seed phrases, each seed phrase being a sequence of one or more words that is associated with a category of talent-screening questions; accessing a job description of a first job posting; determining sentences in the job description; and for each sentence: checking for a match of the sentence to one of the seed phrases; and based on the match, identifying a talent-screening question for the sentence.

In yet another general aspect, a machine-readable storage medium (e.g., a non-transitory storage medium) includes instructions that, when executed by a machine, cause the machine to perform operations comprising: analyzing a plurality of job postings to identify seed phrases, each seed phrase being a sequence of one or more words that is associated with a category of talent-screening questions; accessing a job description of a first job posting; determining sentences in the job description; and for each sentence: checking for a match of the sentence to one of the seed phrases; and based on the match, identifying a talent-screening question for the sentence.

One general aspect includes a method that includes: analyzing, by one or more processors, a plurality of job descriptions to generate ngrams, each ngram comprising one or more words; identifying, from the ngrams, top bigrams and top trigrams according to frequency of appearance in the job descriptions; removing from consideration bigrams and trigrams comprising stop words, negation words, or requirement words, to obtain first seed phrases; selecting a predetermined number of bigrams and trigrams, based on a frequency of appearance in the job descriptions, to generate a second list of seed phrases; and adding the second list of seed phrases to the first seed phrases to obtain a combined set of seed phrases, each seed phrase being a sequence of one or more words that is associated with a category of talent-screening questions.

In one example, the method further comprises tokenizing the first seed phrases to obtain tokens.

In one example, selecting the predetermined number of bigrams and trigrams further comprises selecting, from the predetermined number of bigrams and trigrams, ngrams that contain at least one token and that do not contain any stop word, negation word, or requirement word to obtain the second list of seed phrases.

In one example, the ngrams comprise unigrams, bigrams, and trigrams.

In one example, the method further comprises, before the removing, identifying the stop words, the negation words, and the requirement words in a predetermined number of unigrams.

In one example, the method further comprises identifying a talent-screening question for a job posting based on a job description of the job posting and the combined set of seed phrases.

In one example, the method further comprises causing presentation of the identified talent-screening question in a user interface.

One general aspect includes a method comprising: determining, by one or more processors, sentences in a job description, and, for each sentence: checking, by the one or more processors, for a match of the sentence to one of a plurality of seed phrases, each seed phrase being a sequence of one or more words that is associated with a category of talent-screening questions; and based on the match, identifying, by the one or more processors, a talent-screening question for the sentence.

In one example, checking for a match comprises a first match operation, the first match operation comprising determining matches in the sentence to seed phrases with three or more words.

In one example, checking for a match comprises a second match operation, the second match operation comprising determining the sentences with requirement words that match seed phrases with two or more words.

In one example, checking for a match comprises a third match operation, the third match operation comprising finding sentences comprising a word appearing in the seed phrases, a second word that is associated with the word appearing in the seed phrases, and a requirement word.

In one example, the method further comprises calculating a score for each matched sentence, the score calculated as a number of words matching the seed phrase divided by a number that is calculated as a total number of words in the sentence minus a number of stop words in the sentence.

In one example, the method further comprises determining talent-screening questions for sentences with a score above a predetermined threshold.

In one example, the method further comprises causing presentation of the determined talent-screening questions in a user interface.

In view of the disclosure above, various examples are set forth below. It should be noted that one or more features of an example, taken in isolation or combination, should be considered within the disclosure of this application.

Figure 8:
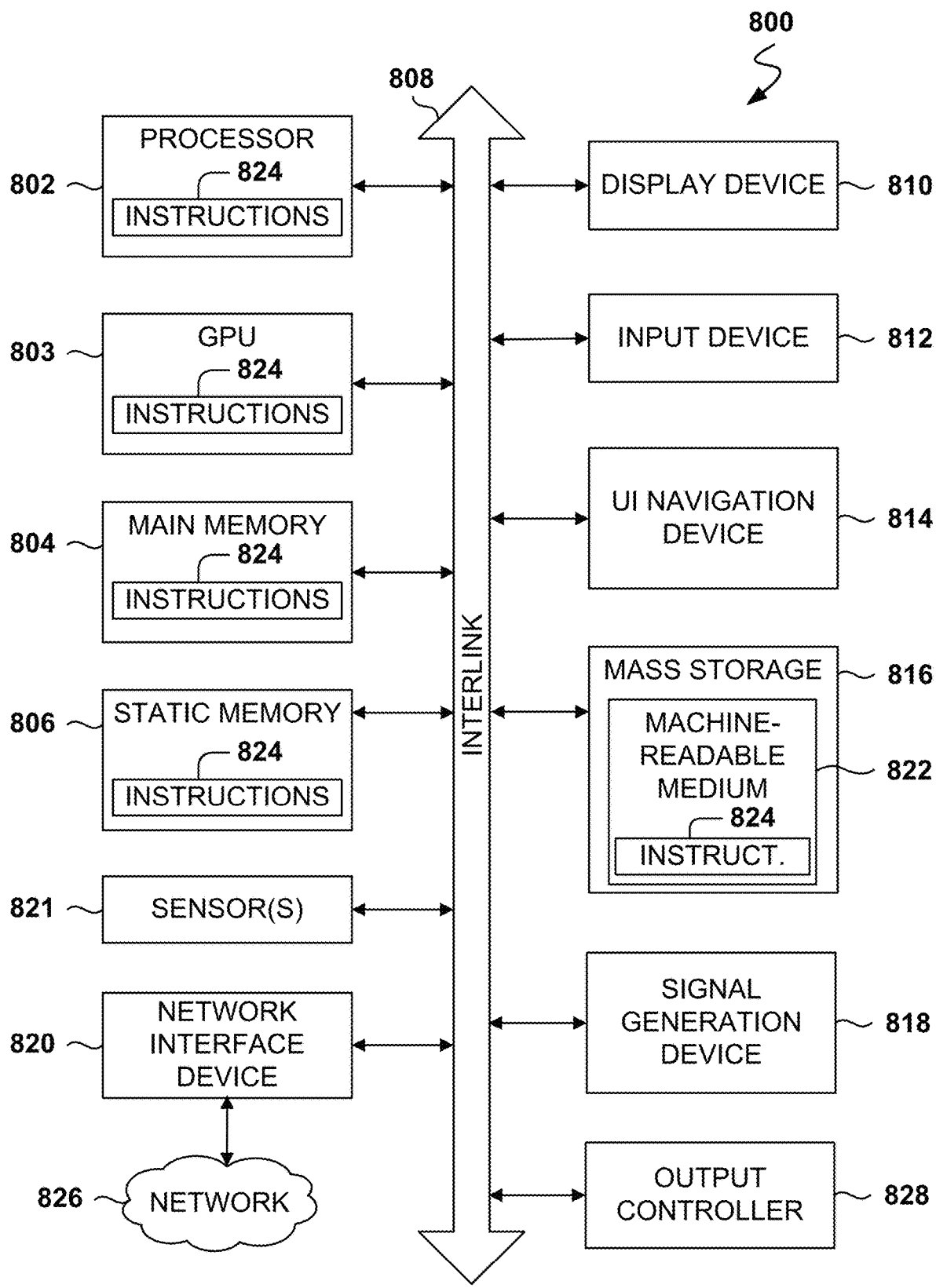
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink 808 (e.g., bus). The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
determining, by one or more processors, sentences in a job description; and
for each sentence:
checking, by the one or more processors, for a match of the sentence to one of a plurality of seed phrases, each seed phrase being a sequence of one or more words that is associated with a category of talent-screening questions, wherein checking for the match comprises:
performing a first match operation to determine matches in the sentence to seed phrases with three or more words; and
performing a second match operation to determine the sentences with requirement words that match seed phrases with two or more words;
based on the match, identifying, by the one or more processors, a talent-screening question for the sentence;
adding the second seed phrases to the first seed phrases to obtain third seed phrases, each seed phrase being a sequence of one or more words that is associated with a category of talent-screening questions;
wherein checking for a match comprises a third match operation, the third match operation comprising finding sentences comprising a word appearing in the seed phrases, a second word that is associated with the word appearing in the seed phrases, and a requirement word; and
wherein finding sentences comprising a word appearing in the seed phrases comprises creating an inverted-index word map of the seed phrases by tokenizing the seed phrases into words and associating each word with the other words that appear in the seed phrases, wherein finding sentences comprising the second word associated with the word appearing in the seed phrases is based on the inverted-index word map of the seed phrases.

2. The method as recited in claim 1, further comprising:
calculating a score for each matched sentence, the score calculated as a number of words matching the seed phrase divided by a number that is calculated as a total number of words in the sentence minus a number of stop words in the sentence.

3. The method as recited in claim 1, further comprising:
determining talent-screening questions for sentences with a score above a predetermined threshold.

4. The method as recited in claim 3, further comprising:
causing presentation of the determined talent-screening questions in a user interface.

5. An apparatus, comprising:
circuitry; and
memory operably coupled to the circuitry, the memory storing instructions that when executed by the circuitry, causes the circuitry to:
determine sentences in a job description; and
for each sentence:
check for a match of the sentence to one of a plurality of seed phrases, each seed phrase being a sequence of one or more words that is associated with a category of talent-screening questions, wherein the check for the match comprises:
perform a first match operation to determine matches in the sentence to seed phrases with three or more words; and
perform a second match operation to determine the sentences with requirement words that match seed phrases with two or more words;
based on the match, identify a talent-screening question for the sentence;
add the second seed phrases to the first seed phrases to obtain third seed phrases, each seed phrase being a sequence of one or more words that is associated with a category of talent-screening questions;
wherein the check for a match comprises a third match operation, the third match operation comprising find sentences comprising a word appearing in the seed phrases, a second word that is associated with the word appearing in the seed phrases, and a requirement word; and
wherein find sentences comprising a word appearing in the seed phrases comprises create an inverted-index word map of the seed phrases by tokenization of the seed phrases into words and association of each word with the other words that appear in the seed phrases, wherein find sentences comprises the second word associated with the word appearing in the seed phrases is based on the inverted-index word map of the seed phrases.

6. The apparatus as recited in claim 5, the circuitry to:
calculate a score for each matched sentence, the score calculated as a number of words matching the seed phrase divided by a number that is calculated as a total number of words in the sentence minus a number of stop words in the sentence.

7. The apparatus as recited in claim 5, the circuitry to:
determine talent-screening questions for sentences with a score above a predetermined threshold.

8. The apparatus as recited in claim 7, the circuitry to:
cause presentation of the determined talent-screening questions in a user interface.

9. A non-transitory computer-readable storage medium, the computer-readable storage medium including instructions that when executed by circuitry, cause the circuitry to:
determine sentences in a job description; and
for each sentence:
check for a match of the sentence to one of a plurality of seed phrases, each seed phrase being a sequence of one or more words that is associated with a category of talent-screening questions, wherein the check for the match comprises:
perform a first match operation to determine matches in the sentence to seed phrases with three or more words; and
perform a second match operation to determine the sentences with requirement words that match seed phrases with two or more words;
based on the match, identify a talent-screening question for the sentence;

add the second seed phrases to the first seed phrases to obtain third seed phrases, each seed phrase being a sequence of one or more words that is associated with a category of talent-screening questions;

wherein the check for a match comprises a third match operation, the third match operation comprising find sentences comprising a word appearing in the seed phrases, a second word that is associated with the word appearing in the seed phrases, and a requirement word; and wherein find sentences comprising a word appearing in the seed phrases comprises create an inverted-index word map of the seed phrases by tokenization of the seed phrases into words and association of each word with the other words that appear in the seed phrases, wherein find sentences comprises the second word associated with the word appearing in the seed phrases is based on the inverted-index word map of the seed phrases.

10. The computer-readable storage medium of claim 9, comprising instructions that when executed by circuitry, cause the circuitry to:

calculate a score for each matched sentence, the score calculated as a number of words matching the seed phrase divided by a number that is calculated as a total number of words in the sentence minus a number of stop words in the sentence.

11. The computer-readable storage medium of claim 9, comprising instructions that when executed by circuitry, cause the circuitry to:

determine talent-screening questions for sentences with a score above a predetermined threshold.

12. The computer-readable storage medium of claim 11, comprising instructions that when executed by circuitry, cause the circuitry to:

cause presentation of the determined talent-screening questions in a user interface.

* * * * *